(12) United States Patent
O'Connell et al.

(10) Patent No.: US 10,177,545 B2
(45) Date of Patent: Jan. 8, 2019

(54) ROTATING CONDUCTOR HOLDER

(71) Applicant: QUANTA ASSOCIATES, LP, Houston, TX (US)

(72) Inventors: Daniel Neil O'Connell, Oliver (CA); David Karl Wabnegger, Langley (CA)

(73) Assignee: Quanta Associates, L.P., Houston, TX (US)

( * ) Notice: Subject to any disclaimer, the term of this patent is extended or adjusted under 35 U.S.C. 154(b) by 376 days.

(21) Appl. No.: 14/706,820

(22) Filed: May 7, 2015

(65) Prior Publication Data

US 2015/0325985 A1 Nov. 12, 2015

Related U.S. Application Data

(60) Provisional application No. 61/990,213, filed on May 8, 2014.

(51) Int. Cl.
*H02G 1/02* (2006.01)
*H02G 7/05* (2006.01)

(52) U.S. Cl.
CPC .............. *H02G 1/02* (2013.01); *H02G 7/05* (2013.01)

(58) Field of Classification Search
CPC ... H01G 1/02; H01G 1/04; H01G 7/02; B25B 11/00; B25B 11/02; B60L 11/00; B60L 1/00
USPC .................. 254/134.4, 134.4 R; 269/37, 17
See application file for complete search history.

(56) References Cited

U.S. PATENT DOCUMENTS

| | | | |
|---|---|---|---|
| 1,501,590 A | 7/1924 | Floyd | |
| 3,905,500 A | 9/1975 | Bourges | |
| 4,183,511 A * | 1/1980 | Marek | B66C 23/48 |
| | | | 254/100 |
| 4,466,506 A | 8/1984 | Dolenti | |
| 5,538,207 A | 7/1996 | O'Connell et al. | |
| 6,837,671 B2 | 1/2005 | Devine | |
| 7,448,606 B1 * | 11/2008 | Johnson | B05B 13/0285 |
| | | | 269/16 |
| 8,328,173 B1 * | 12/2012 | DesForge | B25H 1/0007 |
| | | | 248/176.1 |
| 2011/0011987 A1 | 1/2011 | Lessard | |
| 2012/0175575 A1 | 7/2012 | Devine et al. | |
| 2015/0030426 A1 | 1/2015 | Fritel et al. | |
| 2015/0325985 A1 * | 11/2015 | O'Connell | H02G 1/02 |
| | | | 254/134.3 R |

OTHER PUBLICATIONS

Thomas, Shane, International Search Report, Sep. 14, 2015, 4 pages, US Patent and Trademark Office, Alexandria, Virginia.

(Continued)

*Primary Examiner* — Lee D Wilson
(74) *Attorney, Agent, or Firm* — Mark A. Oathout; Oathout Law Firm; Antony C. Edwards

(57) ABSTRACT

A rotating conductor holder includes at least a first and second conductor retainer, which are mounted to and spaced apart along a rotating base member at a distance substantially corresponding to the separation distance between the two or more existing sub-conductors that are to be replaced during a restringing procedure. The base member is rotatably attached to a support, which may be mounted on at least one insulator. The at least one insulator may be mounted on an arm on the end of a boom. An actuator and linkage may be provided to rotate the base member about its support.

37 Claims, 7 Drawing Sheets

(56) References Cited

OTHER PUBLICATIONS

Thomas, Shane, Written Opinion of the International Searching Authority, Sep. 14, 2015, 8 pages, US Patent and Trademark Office, Alexandria, Virginia.

* cited by examiner

ROTATING CONDUCTOR HOLDER

FIELD OF INVENTION

This invention relates to the field of reconductoring or restringing of energized, high voltage power lines without interrupting the service provided by the existing lines.

BACKGROUND OF THE INVENTION

Applicant engages, amongst other activities, in the reconductoring or restringing of energized, high voltage power lines without interrupting the service provided by the existing lines. During the execution of the restringing process, a new conductor is often pulled into an occupied position on support structures such as towers or poles supporting the existing conductors.

In some circumstances, two, three or more sub-conductors may need to be replaced during the same reconductoring project. In a high voltage (for example, greater than or equal to 69 kV) alternating current transmission system, multiple sub-conductors may be utilized to carry each phase of the alternating current system. Typically, alternating current is generated in a three-phase configuration, where, respectively, phases A, B and C are each transported on a separate conductor, where, commonly, each separate single phase conductor is referred to as a "phase". Since all three phase conductors are strung on and occupy the same support structures, it is necessary to configure the phases so that they do not touch each other. The three phases may be arranged in a vertical configuration along a pole or tower, with a pre-determined separation distance between each of the phases. The greater the voltage, the greater the phase separation distance. Another configuration is to arrange the three phase conductors in a horizontal configuration, typically spaced apart by the pre-determined separation distance along a cross arm.

Often, more than one electrical conductor (referred to herein as sub-conductors) carries the power load for a particular phase. This may be done in circumstances where the load is greater than what a single conductor can accommodate. Where more than one sub-conductor is used, it is referred to as bundle conductor i.e.: two bundle or three bundle. In such cases, sub-conductors may be positioned next to each other in what is referred to as horizontal configuration or may hang in a vertical orientation from the same insulator, separated from each other by electrically conductive spacers.

During a reconductoring or restringing procedure involving more than one sub-conductor, in order to remove the existing sub-conductors, each of the sub-conductors are positioned in dollies, otherwise known as travelers, and each sub-conductor may also be secured end-to-end to the replacement sub-conductor and the existing sub-conductor pulled out, using a v-groove puller or similar machine, so as to pull the replacement sub-conductor into position. To avoid the entanglement of the sub-conductors as they are being removed or restrung into place, the sub-conductors being removed from the system must be placed in travelers, spaced apart and in for example a substantially horizontal relationship relative to one another. However, this process of moving the sub-conductors into the travelers is cumbersome and time-consuming when the sub-conductors being worked on are secured on the support structure in a vertical relationship with respect to each other, as the sub-conductors must each be rotated and placed in the travelers in a horizontal position. In addition, each of the sub-conductors are typically large and heavy. Each phase conductor, may for example, weigh 1000 lbs. or more, which further adds to the burden of lifting and positioning each of the sub-conductors in the travelers. Because the sub-conductors are heavy, linemen cannot simply move them into position in the travelers using hot sticks. Typically, a heavy mechanical lifting device must be used to move each of the sub-conductors, for example using a boom mountable robotic arm or single point lifter.

After the old sub-conductors have been removed and the new sub-conductors have been strung through the travelers, each new sub-conductor must be carefully moved from the traveler and secured to the support structure, which process must again rotate the sub-conductors from a horizontal position to a vertical position.

SUMMARY OF THE INVENTION

The present invention is a rotating conductor holder which holds two or more live sub-conductors for rotation of the sub-conductors through an approximately 90 degree rotational arc, for example such that the sub-conductors are rotated relative to one another in the conductor holder between a vertical and a horizontal orientation. The present invention also includes a method for employing the rotating conductor holder to reposition two or more sub-conductors, for example during a restringing procedure.

The rotating conductor holder includes at least a first and second conductor retainer, which are mounted to and spaced apart along a rotating base member at a distance substantially corresponding to the separation distance between the two or more existing sub-conductors that are to be replaced during, for example, a restringing procedure. The separation distance may be for example 18 inches. The base member is rotatably attached to a support, which may be for example a vertical support member such as a pylon. In one embodiment not intended to be limiting, the vertical support member may be reinforced by a side gusset.

The rotating conductor holder may also include vertical and horizontal stops, so as to limit the angular or rotational displacement of the base member to the desired angular or rotational displacement. The angular displacement of the rotational arc may advantageously be approximately 90 degrees for the purpose of changing the relative positioning of multiple sub-conductors from a vertical position to a horizontal position or vice versa. However, it will be understood by a person skilled in the art that other angular displacements may work and be useful, and that the invention described herein is not limited to the aforesaid 90 degrees for the rotation of the base member relative to its vertical support member. The support member may be mounted on a support plate, or may be otherwise adapted for mounting to for example a single point lifting apparatus or other robotic arm or mechanical device on the end of a boom arm that provides for positioning and manipulation of the rotating conductor holder. Typically, insulators are provided between the support plate and the boom.

Thus, in summary, the rotating conductor holder described herein may be characterized in one aspect as including at least a first and second conductor retainer mounted to and spaced apart along a base member at substantially a pre-determined spacing therebetween corresponding to the spacing between the sub-conductors, a support adapted to be mountable atop at least one insulator, wherein the base member is rotatably mounted on the support. A remotely actuated actuator, for example manually actuated, hydraulically actuated, electrically actuated, pneumatically actuated, etc., as would be known to one skilled in the art, may be provided cooperating with the base member whereby, upon actuation of the actuator, the base member is selectively rotatable through an arc of rotation relative to the support. In a preferred embodiment the actuator or its actuating linkage includes an insulator electrically insulating opposite ends of the actuator or opposite ends of the linkage from each other. In that embodiment the angular displacement or range of motion of the arc of rotation is governed by a corresponding range of actuation of the actuator or by the range of motion of the mechanical linkage.

In a preferred embodiment, not intended to be limiting, the base member is a cross-arm, and the support includes a pylon, wherein the cross-arm has at least one of the conductor retainers mounted on each of opposite ends of the cross-arm, and wherein the cross-arm is pivotally mounted on one end of the pylon, preferably the upper end, and an opposite end of the pylon is adapted for mounting on the at least one insulator. Advantageously, the cross-arm is pivotally mounted on the pylon at substantially a mid-way along the cross-arm.

In one embodiment, the conductor retainers each include u-shaped conductor retainers or wire cages having openings into the conductor retainers or wire cages. The range of motion of the cross-arm may be substantially 90 degrees between a vertical position wherein the cross-arm is substantially vertical and a horizontal position wherein the cross arm is substantially horizontal. The conductor retainers or wire cages are oriented on the cross-arm at 45 degrees, relative to the cross-arm so that the openings are open upwardly when the cross-arm is in both the vertical and horizontal positions and across the entire range of motion of the cross-arm.

In embodiments employing an actuator, the actuator and its actuating linkage may include an elongate electrically insulated rod between upper and lower driven linkages. The upper and lower driven linkages may be for example upper and/or lower linkages driven by a linear actuator such as for example a hydraulic cylinder or other type of actuator such as for example a screw drive driven by an electric motor. Advantageously the insulated rod may be substantially parallel to the at least one insulator, and the pylon is mounted at an upper end thereof. A lower end of the at least one insulator may be mounted on a levelable lifter base adapted to be mounted onto an end of a boom.

The conductor retainers or wire cages may have conductor retention covers or other forms of closures over the openings.

The rotating conductor holder according to the present invention may also be used in a method which also forms part of the present invention.

DETAILED DESCRIPTION OF EMBODIMENTS OF THE INVENTION

Figure 1:
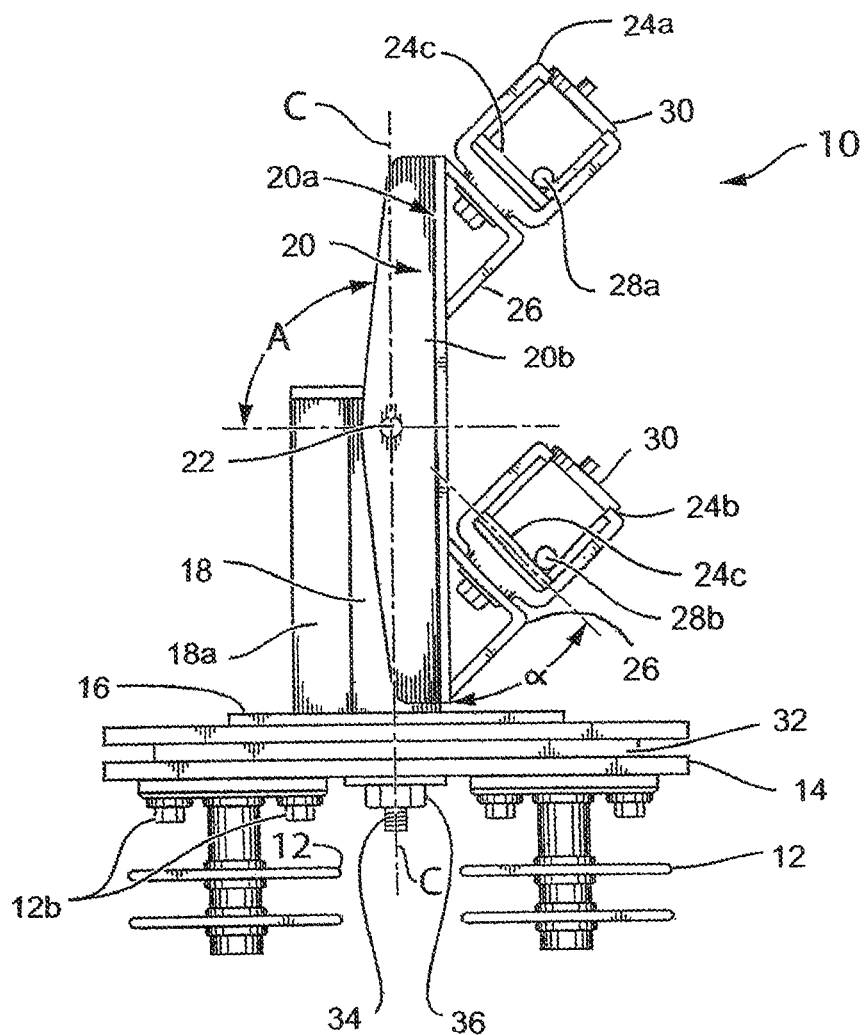
FIG. 1 is, in front elevation view, a rotating conductor holder according to a first embodiment, shown holding two sub-conductors held spaced apart in their respective conductor retainers, rotated so as to be positioned in a vertical relationship with respect to each other.
Figure 2:
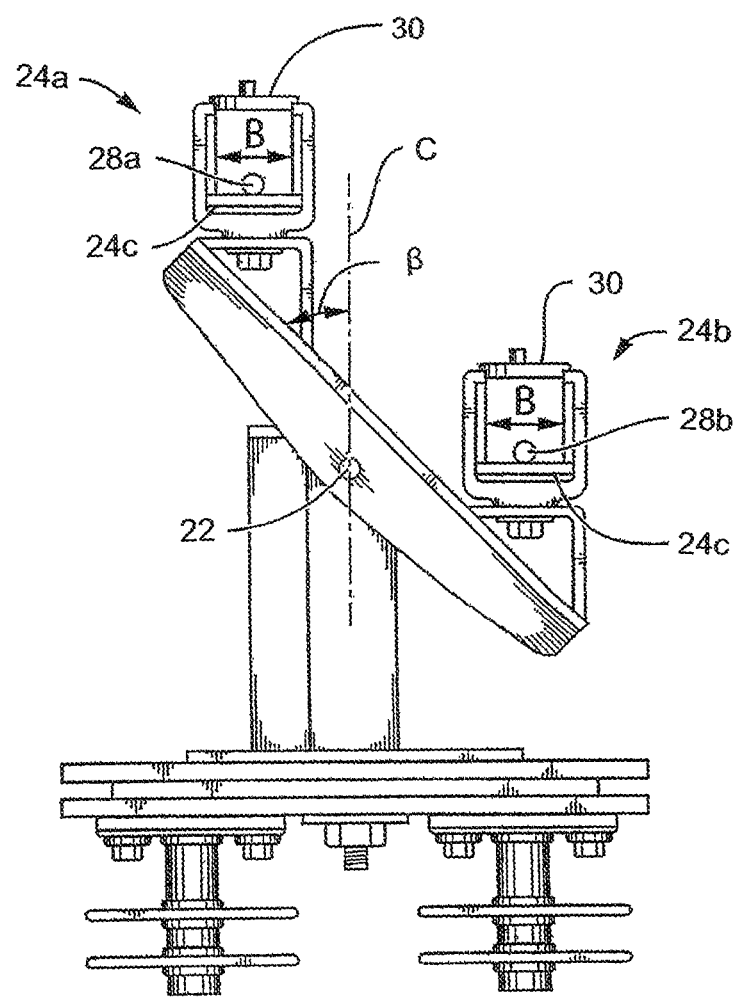
FIG. 2 illustrates the rotating conductor holder of FIG. 1, showing the relative positions of each of the sub-conductors after the conductor retainers have been rotated through a 45 degree angular displacement relative to the vertical support.
Figure 3:
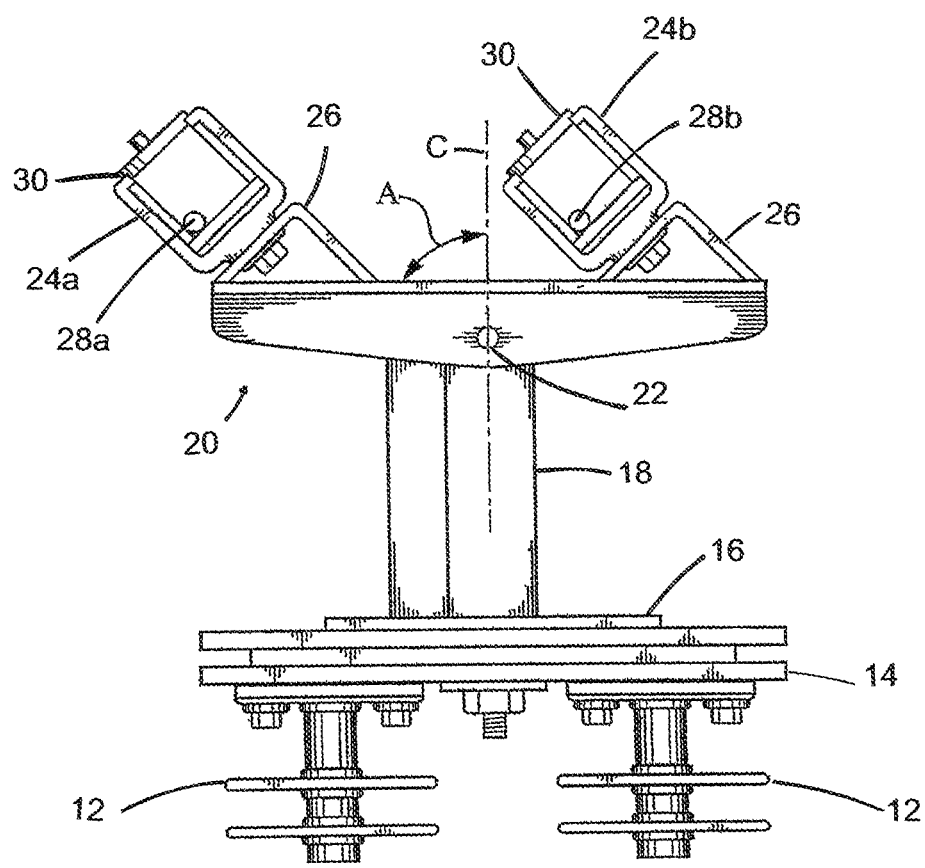
FIG. 3 illustrates the rotating conductor holder of FIG. 1, showing the relative positions of each of the sub-conductors after the holder has rotated through a 90 degree angle.

As seen in the exemplary embodiment of FIGS. 1-3 and the further exemplary embodiment of FIGS. 4-7, a rotating conductor holder is provided to hold two or more sub-conductors that are positioned in a vertical relationship with respect to one another and to rotate those sub-conductors such that they are in a horizontal position with respect to each other, and vice-versa, while maintaining the desired or required separation distance between the sub-conductors. Thus, the rotating conductor holder may be used to simultaneously hold two or more sub-conductors that are positioned in a horizontal relationship relative to each other and rotate those sub-conductors into a vertical relationship relative to each other, or to intermediate positions therebetween. In this manner, the sub-conductors may be simultaneously moved from their vertically spaced apart positions on a support structure and positioned in or near horizontally spaced apart travelers without allowing the sub-conductors to come into contact with each other, thereby reducing the amount of time and labour required to safely position the sub-conductors onto their respective travelers during a restringing procedure.

Figure 4:
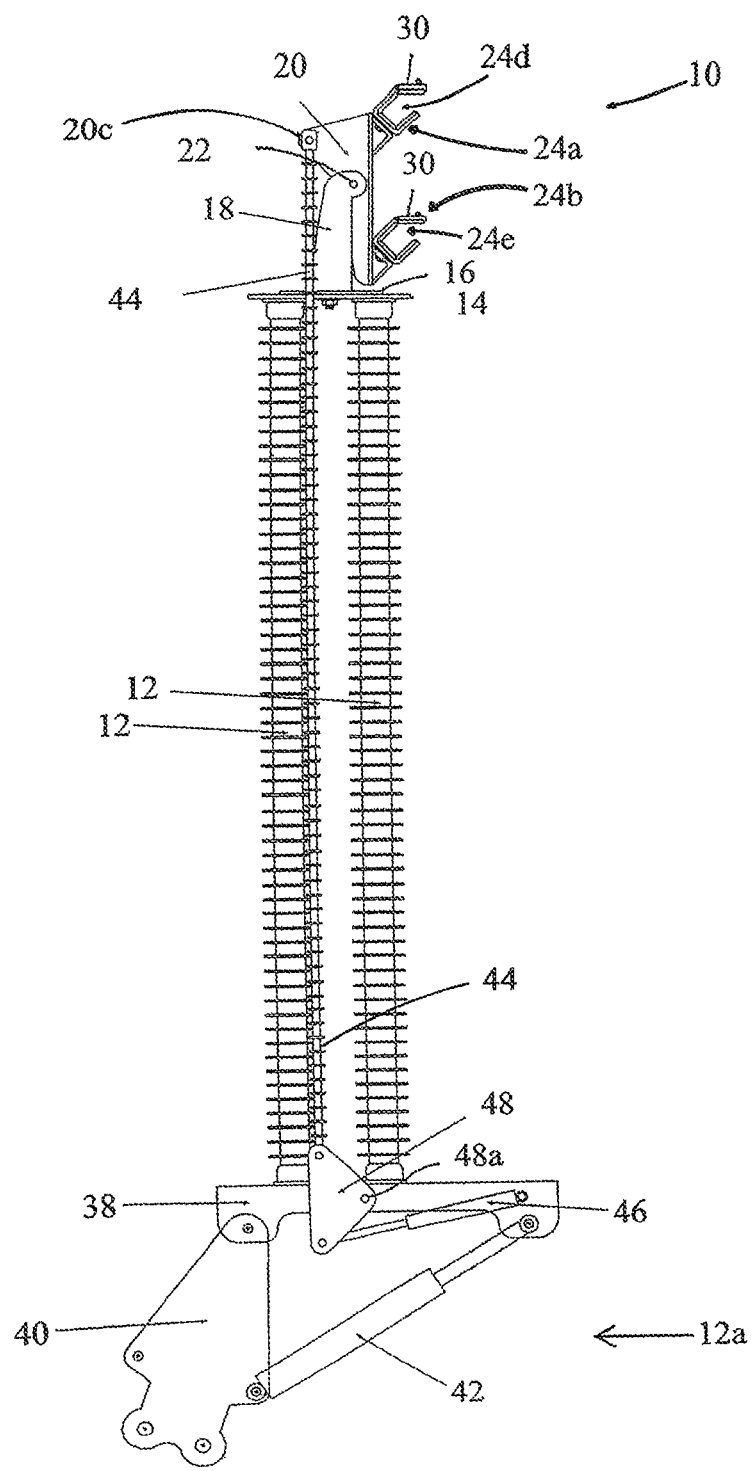
FIG. 4 is, in front elevation view, a further embodiment of the rotating conductor holder, wherein the cross-arm of the rotating conductor holder is in a vertical orientation and has an actuator and actuating linkage, and wherein the rotating conductor holder is shown mounted on top of station class insulators, themselves mounted on top of a boom adaptor, wherein the conductor retainers on the cross-arm are open.

The rotating conductor holder may be mounted to the support plate of a device adapted for manipulating live conductors. By way of an example, without intending to be limiting, as seen in FIG. 4, a single point lifter such as disclosed in U.S. Pat. No. 6,837,671, may be used to support a rotating conductor holder. When mounted to a single point lifter of the kind illustrated in U.S. Pat. No. 6,837,671, one of the hydraulic actuators of the single point lifter may be used to lift a sub-conductor out of its existing support and manipulate it into one of the conductor retainers of the present invention. The leveling actuator of the single point lifter may be used to orient the support plate into the horizontal and thus to also orient the support member or pylon into the vertical.

In an alternative embodiment, the present invention may include an independent actuator, such as for example a hydraulic cylinder or screw drive driven by an electric motor cooperating between a vertical support member or base plate and the rotating base member of the rotating conductor holder, wherein the actuator may be remotely controlled to rotate the rotating base member.

Reviewing the Figures in more detail, in one embodiment a rotating conductor holder 10 is supported on insulators 12, for example mounted on a single point lifter 12a, itself adapted for mounting on the end of a boom (not shown). The upper ends of insulators 12 are secured to a support plate 14 by fasteners 12b. Support plate 16 is mounted down onto support plate 14. Fasteners 12b may include, but are not limited to, bolts, screws, rivets, pins, welds or other fasteners known to those skilled in the art.

A vertical support, for example, pylon 18, is mounted on support plate 16. Pylon 18 may be for example braced by a side gusset 18a. Side gusset 18a provides additional strength to pylon 18 and may for example act as a stop to arrest the rotation of rotating base member 20 as it rotates from vertical to horizontal.

Rotating base member 20 is rotatably mounted to pylon 18 for example by means of a hinge or shaft or pivot pin 22 (collectively referred to herein as a pivot or pin). Base member 20 includes a flange 20a mounted on a cross member 20b. First and second conductor retainers 24a and 24b are mounted on flange 20a at an angle α relative to the surface of flange 20a by means of brackets 26. Preferably, angle α is approximately 45 degrees. The surface of flange 20a may, as illustrated, be planar.

Conductors 28a and 28b are secured within their corresponding conductor retainers 24a and 24b by selectively closeable latches, doors, covers or other closures 30. With the conductors 28a, 28b held in their respective conductor retainers 24a, 24b, sub-conductors 28a, 28b may be rotated through a 90 degree angular displacement A so as to maintain their separation distance during angular displacement A by rotation of base member 20 about pivot 22. Due to the angular orientation a of conductor retainers 24a, 24b, as base member 20 rotates about pivot 22 across its angular displacement A, sub-conductors 28a, 28b remain held by gravity against floors 24c. As illustrated, as base member 20 pivots, the sub-conductors merely slide in directions B across the floors 24c of the conductor retainers. Consequently, the sub-conductors do not contact closures 30, thereby minimizing the risk of the loss of a sub-conductor from within its conductor retainer during angular displacement A of base member 20 about pivot 22.

In the orientation of FIG. 1, where sub-conductors 28a, 28b are strung between a pair of support structures such as poles or towers (not shown) so that the sub-conductors hang vertical, suspended, stacked one over another, using rotating conductor holder 10 the sub-conductors 28a, 28b may be captured and secured within their respective conductor retainers 24a, 24b. Rotating base member 20 is then actuated so as to begin rotating through an angle β. In FIG. 2, the rotating base member 20 has completed approximately half of its rotation; that is, β is about half of angular displacement A. As can be seen in FIG. 2, each of the sub-conductors 28a, 28b remain safely secured in their conductor retainers 24a, 24b during the rotation across angular displacement A of rotating base member 20. With reference to FIG. 3, once the rotating base member 20 has completed its full angular displacement A and thus angle β is substantially 90 degrees, rotating base member 20 is in a substantially horizontal position rather than in its original vertical position. Each of the sub-conductors 28a, 28b remain securely in place against floors 24c within their conductor retainers.

Although angle α is preferably substantially 45 degrees, it will be appreciated by a person skilled in the art that the conductor retainers 24a, 24b may be mounted at an angle α that is less or greater than 45 degrees, so long as the sub-conductors remain within their conductor retainers, preferably lying against floors 24c during the entire angular displacement A to thereby avoid contacting closures 30 and inadvertently releasing the closures 30 and thereby releasing the sub-conductors.

In a further embodiment, a swivel plate 32 is mounted between plates 14 and 16. Bolt 34 is mounted to the underside of the plate 16 so as to protrude orthogonally downwardly therefrom through corresponding aperture (not shown) in swivel plate 32 and plate 14. Bolt 34 is secured under plate 14 by nut 36. When nut 36 is loosened, conductor holder 10 may be rotated into a desired alignment about vertical axis of rotation C. Nut 36 is tightened to anchor the desired alignment. Nut 36 may also be left somewhat loose so as to allow continuous rotational alignment.

In FIGS. 4-7 a rotating conductor holder 10 is shown mounted, via insulators 12, onto a single point lifter 12a. Single point lifter 12a includes a lifter base 38 pivotally mounted onto a truck boom adapter 40. The truck boom adapter mounts onto the end of a truck-mounted boom (not shown). A levelling cylinder 42 is mounted between lifter base 38 and truck boom adapter 40. Actuation of levelling cylinder 42 allows an operator to remotely level lifter base 38, thereby bringing insulators 12 and pylon 18 to the vertical.

Figure 5:
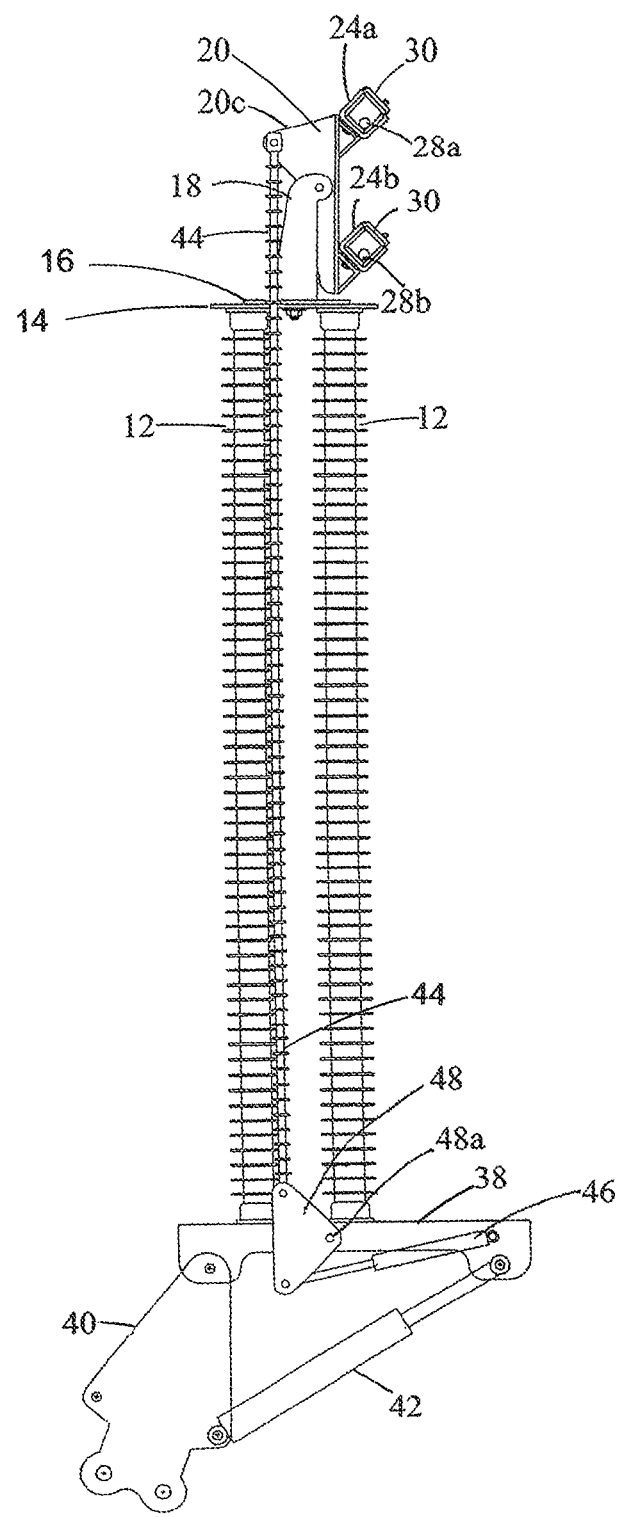
FIG. 5 is the view of FIG. 4 wherein the conductor retainers contain sub-conductors and are closed.

As described above, insulators 12, which may be station class insulators as required and as would be known to one skilled in the art, support rotating conductor holder 10 thereon. Pylon 18 is advantageously mounted so as to distribute the downward load of the weight of the conductor holder 10 and the sub-conductors held therein onto insulators 12. Thus pylon 18 may as illustrated be mounted on plates 14 and 16 so as be between the upper ends of the insulators 12. Pylon 18 supports pivot 22 at sufficient elevation above plate 16 so that rotating base member 20 has clearance above plate 16 when base member 20 is oriented vertically as seen in FIGS. 1, 4 and 5. In the embodiment of FIGS. 4-7 a linkage such as for example an actuating rod 44 extends between rotating base member 20 and lifter base 38. Rod 44 is electrically insulated. For example, rod 44 may be a polymer insulator. In one example of an actuating linkage which includes rod 44, and not intending to be limiting, an actuator cylinder 46 mounted to lifter base 38 drives a triangular linkage 48 which is pivotally mounted at pivot 48a to lifter base 38. The lower end of rod 44 is pivotally mounted to triangular linkage 48 so that, upon actuation of cylinder 46, triangular linkage 48 rotates about pivot 48a thereby driving rod 44 substantially vertically upwards, upon extension of cylinder 46, or downwards, upon retraction of cylinder 46.

The upper end of rod 44 is pivotally mounted to lobe 20c of rotating base member 20, so that upwards displacement of rod 44 rotates base member 20 clockwise as viewed in FIGS. 4 and 5 to thereby rotate base member 20 to the vertical. Downwards displacement of rod 44 rotates base member 20 to the horizontal. Stops such as found in the embodiment of FIGS. 1-3 may not be needed as the range of the angular displacement of base member 20 about pivot 22 is governed by the length of the stroke of cylinder 46.

Figure 6:
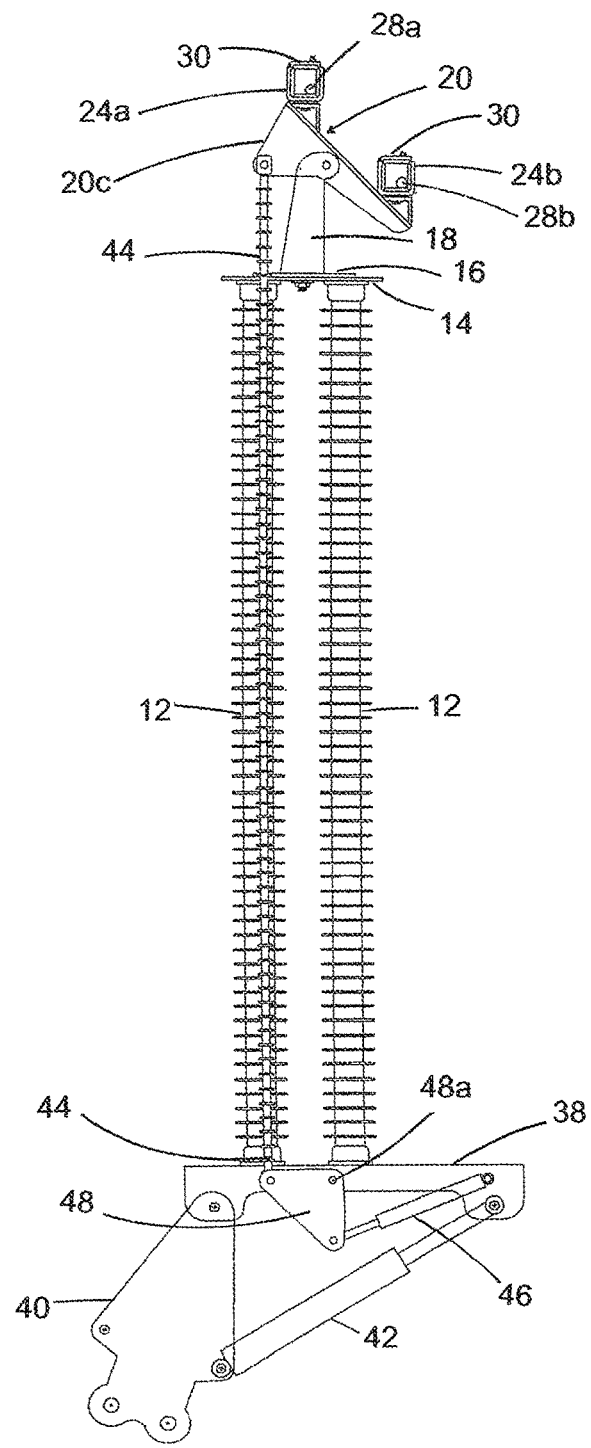
FIG. 6 is the view of FIG. 5 with the cross-arm rotated 45 degrees from the vertical.
Figure 7:
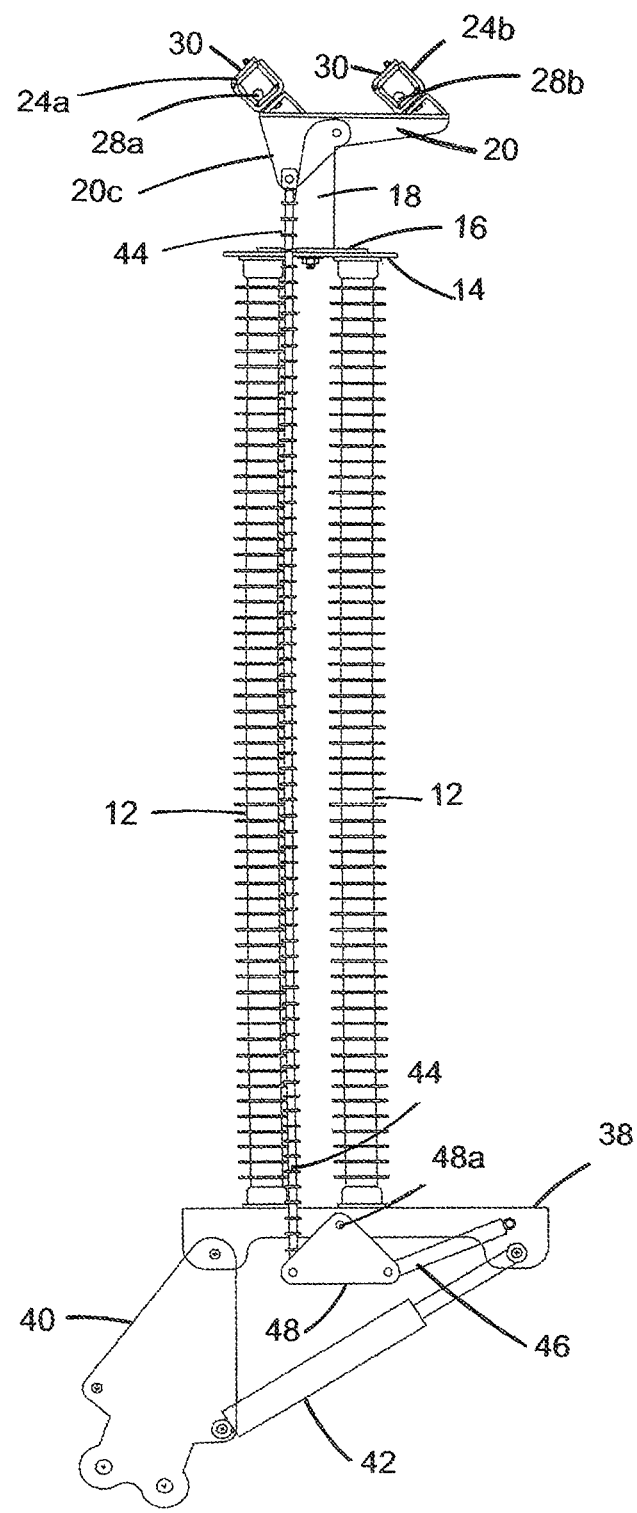
FIG. 7 is the view of FIG. 6 with the cross-arm rotated to the horizontal.

FIG. 5 shows sub-conductors 28a, 28b captured in conductor retainers 24a, 24b respectively, with closures 30 in their closed positions latching closed over the upwardly inclined openings 24d, 24e of conductor retainers 24a, 24b respectively. As noted above, upwardly inclined openings 24d, 24e remain upwardly inclined as rotating base member 20 rotationally traverses the entire range of angular displacement A so that at no time do the sub-conductors push against the undersides of closures 30. This minimizes the risk of escape of the sub-conductors from their conductor retainers. FIGS. 6 and 7 show base member 20 rotated to a 45 degree orientation and into a horizontal orientation respectively.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electrical conductor holding apparatus adaptable to be mounted to an end of a boom comprising:
   a first conductor retainer and a second conductor retainer;
   a base member defining a through-hole, said first conductor retainer and second conductor retainer mounted to said base member;
   a pin;
   a pylon defining a through-hole at a first end, said base member pivotably mounted to said pylon by said pin passing through said through-hole in said pylon and said through-hole in said base member;
   a support plate to which a second end of said pylon is mounted; and
   at least one insulator mounted to said support plate.

2. The apparatus according to claim 1, wherein said at least one insulator has a first insulator end and a second insulator end, and wherein said first insulator end is mounted to said support plate.

3. The apparatus according to claim 2, further comprising a lifter base to which said second insulator end mounts.

4. The apparatus according to claim 3, further comprising: a boom adapter, said boom adapter pivotably mounted to said lifter base.

5. The apparatus according to claim 4, further comprising:
   a first actuator having a first actuator first end and a first actuator second end, said first actuator first end mounted to said boom adapter, and said first actuator second end mounted to said lifter base.

6. The apparatus according to claim 5, wherein said first actuator controls angular movement of said lifter base.

7. The apparatus according to claim 5, further comprising:
   a linkage pivotably mounted to said lifter plate; and
   a second actuator having a second actuator first end and a second actuator second end, said second actuator first end mounted to said lifter base, and said second actuator second end mounted to said linkage.

8. The apparatus according to claim 7, wherein the second actuator drives said linkage.

9. The apparatus according to claim 7, further comprising:
   an actuating rod having an actuating rod first end and an actuating rod second end, said actuating rod first end pivotably connected to said linkage, and said actuating rod second end pivotably connected to said base member.

10. The apparatus according to claim 9, wherein the actuating rod is electrically insulating.

11. The apparatus according to claim 9, wherein the actuating rod is at least as long as said at least one insulator.

12. The apparatus according to claim 1, wherein said first conductor retainer and said second conductor retainer are completely closeable.

13. The apparatus according to claim 1, wherein said base member is rotatable through at least 90 degrees.

14. The apparatus according to claim 1, wherein said through-hole in said base member is between said first conductor retainer and second conductor retainer.

15. A rotating conductor holder for capturing and rotating the orientation of a plurality of sub-conductors having a pre-determined spacing between them, the apparatus comprising:
   at least a first and second conductor retainer mounted to and spaced apart along a base member at substantially the pre-determined spacing therebetween,
   a support mounted atop at least one insulator, said base member rotatably mounted on said support.

16. The apparatus of claim 15 further comprising a remotely actuated actuator cooperating with said base member whereby, upon actuation of said actuator said base member is selectively rotatable through an arc of rotation relative to said support.

17. The apparatus of claim 16 wherein said actuator includes a linkage member having an insulator electrically insulating opposite ends of said linkage member from each other.

18. The apparatus of claim 16 wherein a range of motion of said arc of rotation is governed by a corresponding range of actuation of said actuator.

19. The apparatus of claim 18 wherein said base member is a cross-arm, and wherein said support includes a pylon, and wherein said cross-arm has at least one of said conductor retainers mounted on each of opposite ends of said cross-arm and wherein said cross-arm is pivotally mounted on one end of said pylon, an opposite end of said pylon said adapted for mounting on said at least one insulator.

20. The apparatus of claim 19 wherein said cross-arm is said pivotally mounted on said pylon at substantially a mid-way long said cross-arm.

21. The apparatus of claim 20 wherein said conductor retainers include u-shaped conductor retainers having openings into said retainers, and wherein said range of motion is substantially 90 degrees between a vertical position wherein said cross-arm is substantially vertical and a horizontal position wherein said cross arm is substantially horizontal, and wherein said retainers are oriented 45 degrees on said cross-arm so that said openings are open upwardly when said cross-arm is in both said vertical and horizontal positions and across said range of motion.

22. The apparatus of claim 21 wherein said linkage member includes an elongate electrically insulated rod between upper and lower driven linkages.

23. The apparatus of claim 22 wherein said upper and lower driven linkages are linkage driven by a linear actuator.

24. The apparatus of claim 23 wherein said rod is substantially parallel to said at least one insulator, and wherein said pylon is mounted at an upper end of said at least one insulator and wherein a lower end of said at least one insulator is mounted on a levelable lifter base adapted to be mounted onto an end of a boom.

25. The apparatus of claim 24 wherein said retainers include conductor retention covers over said openings, and said retainers are inclined substantially 45 degrees relative to said cross-arm.

26. A rotating conductor holder for capturing and rotating the orientation of a plurality of sub-conductors having a pre-determined spacing between them, the apparatus comprising:
   at least a first and second conductor retainer mounted to and spaced apart along a base member at substantially the pre-determined spacing therebetween,
   a support adapted to be mountable atop at least one insulator, said base member rotatably mounted on said support,
   wherein said conductor retainers include u-shaped conductor retainers having openings into said retainers, and wherein said retainers are oriented 45 degrees on said cross-arm so that said openings are open upwardly when said cross-arm is in vertical and horizontal positions and across a range of motion therebetween.

27. The apparatus of claim 26 further comprising a remotely actuated actuator cooperating with said base member whereby, upon actuation of said actuator said base member is selectively rotatable through an arc of rotation relative to said support.

28. The apparatus of claim 27 wherein said actuator includes a linkage member having an insulator electrically insulating opposite ends of said linkage member from each other.

29. The apparatus of claim 28 wherein a range of motion of said arc of rotation is governed by a corresponding range of actuation of said actuator.

30. The apparatus of claim 29 wherein said base member is a cross-arm, and wherein said support includes a pylon, and wherein said cross-arm has at least one of said conductor retainers mounted on each of opposite ends of said cross-arm and wherein said cross-arm is pivotally mounted on one end of said pylon, an opposite end of said pylon said adapted for mounting on said at least one insulator.

31. The apparatus of claim 30 wherein said cross-arm is said pivotally mounted on said pylon at substantially a mid-way long said cross-arm.

32. The apparatus of claim 31 wherein said linkage member includes an elongate electrically insulated rod between upper and lower driven linkages.

33. The apparatus of claim 32 wherein said upper and lower driven linkages are linkage driven by a linear actuator.

34. The apparatus of claim 33 wherein said rod is substantially parallel to said at least one insulator, and wherein said pylon is mounted at an upper end of said at least one insulator and wherein a lower end of said at least one insulator is mounted on a levelable lifter base adapted to be mounted onto an end of a boom.

35. The apparatus of claim 34 wherein said retainers include conductor retention covers over said openings, and said retainers are inclined substantially 45 degrees relative to said cross-arm.

36. The apparatus of claim 1 wherein said base member is selectively rotatable about a vertical axis of rotation.

37. The apparatus of claim 15 wherein said base member is selectively rotatable about a vertical axis of rotation.

* * * * *